June 3, 1930.  F. L. SNYDER  1,761,804
BORING BAR
Filed Oct. 29, 1926
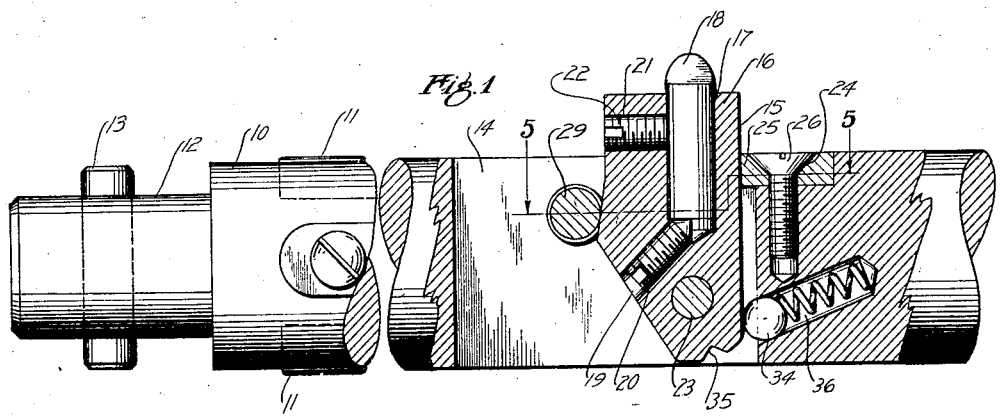
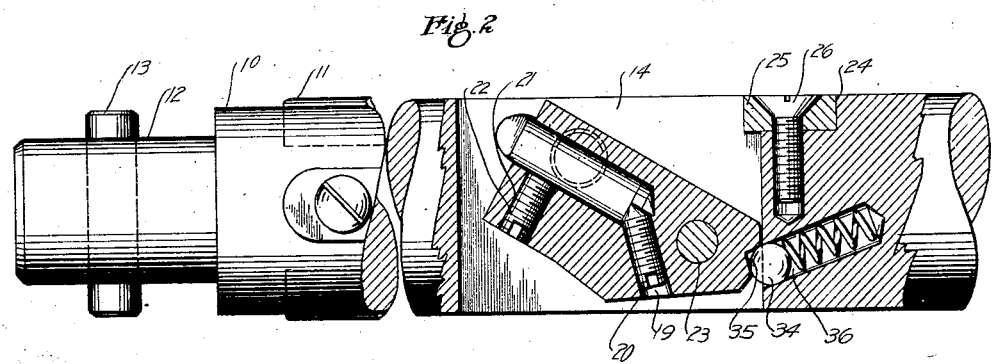
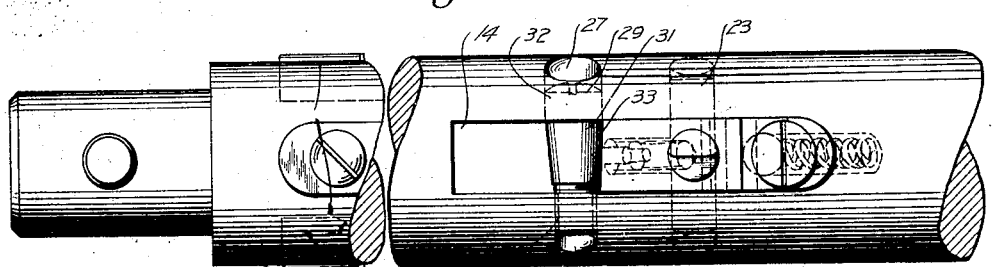
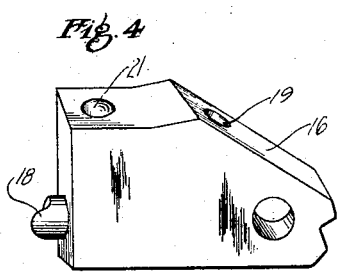
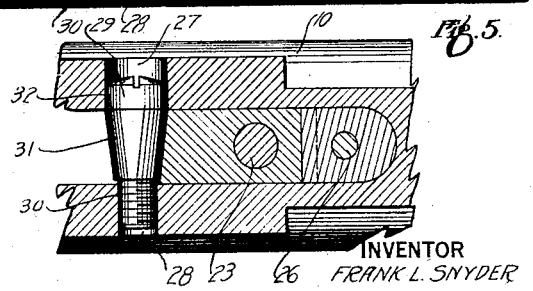
INVENTOR
FRANK L. SNYDER
BY
ATTORNEY Patented June 3, 1930

1,761,804

UNITED STATES PATENT OFFICE

FRANK L. SNYDER, OF CLEVELAND, OHIO, ASSIGNOR TO THE WHITE MOTOR COMPANY, OF CLEVELAND, OHIO, A CORPORATION OF OHIO

BORING BAR

Application filed October 29, 1926. Serial No. 144,984.

This invention relates to boring bars and particularly to an improved construction of the cutting tool supporting member therefor.

One of the objects of the invention is to provide a boring bar having a movable tool supporting member which may be retracted to facilitate the ready removal of the boring bar from the bore, and then returned to the cutting position without altering the predisposed micrometrical adjustment of the cutting tool.

Another object of the invention is to provide a locking mechanism for the tool supporting member which will assure rigid support and effectuate accurate adjustment.

Another object of the invention is to provide an articulated tool supporting member adapted to be yieldingly supported while the tool is retracted from its cutting position and rigidly secured when the tool is in operative adjustment.

Other objects and advantages more or less ancillary to the foregoing reside in the specific construction and aggroupment of elements peculiar to the structure, as will become apparent from a more complete examination of this specification, in the claims of which there are assembled certain combinations of parts and specific constructions indicative of the scope and spirit of the invention.

In the drawings which illustrate a preferred embodiment of the invention:

Figure 1 is a fragmentary view of the end portion of a boring bar embodying the invention, a portion of the bar and the tool supporting member being shown in section in the interest of clearness.

Figure 2 is a similar view illustrating an actuated position of the tool supporting member.

Figure 3 is a top elevational view of the boring bar illustrated in Figure 1.

Figure 4 is a detail view in perspective illustrating the construction of the tool supporting member.

Figure 5 is a detail view in section taken through a portion of the boring bar upon a plane indicated by the line 5—5 in Figure 1.

The improved boring bar illustrated in the drawing comprises a body 10, carrying in the preferred form, a series of longitudinal bearing plates 11, of the usual type and a suitable driving shank 12, which, in present case, includes a transversely disposed pin 13, in the outer end of the bar.

The body of the bar 10, which is preferably of soft steel, is diametrically apertured with an axially disposed rectilinear slot 14, adapted to retain a tool holder 15. This tool holder or tool supporting member embodies a steel block 16, preferably prismoidal in form and recessed at 17, to receive a cutting tool 18, which may be of any approved cross sectional form, depending on the form of the shank of the tool. At the bottom of the recess 17, and communicating therewith, there is an obliquely disposed drilled and tapped hole 19, which receives a conical ended screw 20, the inner end of which may be moved into engagement with the end of the cutting tool to facilitate the vertical adjustments thereof. In the upper portion of the tool block 15, at an angle of 90 degrees to the tool 18, and communicating with the recess 17, there is a second drilled and tapped hole 21, which receives a headless set screw 22, the end of which may be advanced into locking engagement with the side of the shank of the cutting tool 18.

The tool block 16, is formed to fit snugly into the slot 14, and is journalled therein upon a pin 23, the outer ends of which are supported in the adjacent walls of the body of the bar. The pin 23, is located near one end of the slot 14, and somewhat below the center of the bar so that the tool holder 15, may, in its oscillated position, be wholly within the slot 14. Within a channel 24, in the periphery of the bar and at the same end of the slot in which the pin 23, is located, there is a hardened steel stop block 25, positively held in position by the abutting walls of the channel 24, and by a screw 26. The stop block 25, slightly overhangs the slot 14, and is preferably relatively thin in order to eliminate the possibility of chips or other foreign matter from accumulating between the tool holder and the end of the slot 14, and thus jeopardizing the rigidity of the support or the precision of the vertical adjustment. Above the medial axis of the boring bar 10, and intermediate the ends of the slot 14, there are aligned apertures 27 and 28, provided to retain a pin 29, which is adapted to lock the tool holder 15, in its operative position.

The aperture 28, is tapped and embraces the small end of the pin 29, which is correspondingly screw threaded at 30. The central portion of the pin 29, is formed with a conical section 31, terminating in a cylindrical shank 32, which is piloted in the aperture 27. When the tool holder 15, is adjusted in its vertical position the conical portion of the pin 29 will engage the adjacent face 33, of the block 16, which face is preferably formed with a plane downwardly and obliquely inclined to the axis of the pin 29. Upon advancement of the screw 30, the tool holder 15, will be wedged against the stop block 25, and against the side wall of the slot 14, thus providing the rigid and positive securement of the tool holder. It will be noted that the position of the cone 31, and the tapered face 33, of the block are arranged to oppose the resistance of the cutting tool during the boring operation. In the present case the taper is adapted to oppose a clockwise rotation of the tool though obviously a reversal of the taper would be necessary if the boring bar were revolved in the opposite direction.

When the boring operation is completed, but before the bar is withdrawn from the work, the tool may be retracted from its cutting position by removing the pin 29, and then revolving the block 16, to a position within the slot 14, as illustrated in Figure 2. In order to retain the tool holder in this position there is provided a spring pressed ball 34, within the bar, co-operatively associated with an indentation 35, in the tool block 16. The ball 34, is supported in a recess 36, which is so disposed, in relation to the tool holder, as to permit its retention during the vertical adjustment of the tool holder.

It will now be apparent that the articulated tool holder, its appurtenances and support will afford the ready removal of the tool from the bore without injury thereto, and that in duplicate boring operations the adjustment of the cutting tool may be maintained notwithstanding the revolution of the tool holder.

Although the foregoing description is necessarily of a detailed character in order that the invention may be clearly set forth, it is to be understood that the specific terminology is not intended to be restrictive or confining, and that various rearrangements of parts and modifications of structural detail may be resorted to without departing from the scope or spirit of the invention as herein claimed.

Having thus described the invention, what is claimed and desired to be secured by Letters Patent is:—

1. In a boring bar having a slot extending longitudinally therethrough, a tool holder pivoted to the slot-separated portions of the bar, a cutting tool projecting from an end of the holder, said holder being rotatable on its pivot to two alternative positions, in one of which the cutter is projected laterally of the bar, and in the other of which the cutter is telescoped between the slot-separated portions of the bar, rigid retaining means to position and lock the holder with the cutter in its first said position, and a spring pressed ball co-operatively associated with an indentation in said tool holder to retain the holder in its second said position.

2. In a boring bar having a slot extending longitudinally therethrough, a tool holder pivoted to the slot-separated portions of the bar, a cutting tool projecting from an end of the holder, said holder being rotatable on its pivot to two alternative positions, in one of which the cutter is projected laterally of the bar, and in the other of which the cutter is telescoped between the slot-separated portions of the bar, a screw traversing the slot, said screw having a conical portion adapted to engage an angularly disposed surface of the tool holder and lock the tool holder in its first said position and a spring pressed ball co-operatively associated with an indentation in said tool holder to retain the holder in its second said position.

3. In a boring bar having a longitudinal slot extending through the bar, a stop plate mounted in the periphery of the bar and overhanging one end of the slot, a tool holder pivoted to the slot-separated portions of the bar, a cutter tool projecting from an end of the holder, said holder being rotatable on its pivot to two alternative positions, in one of which the tool holder is projected laterally of the bar and against said stop plate, and in the other of which the tool holder is telescoped between the slot-separated portions of the bar, a screw traversing the slot, said screw having a conical portion adapted to engage an angularly disposed surface of the tool holder and lock the tool holder in its first said position, and a spring pressed ball co-operatively associated with an indentation in said tool holder to retain the holder in its second said position.

4. In a boring bar having a longitudinal slot extending through the bar, a stop plate mounted in the periphery of the bar and overhanging one end of the slot, a tool holder pivoted to the slot-separated portions of the bar, a cutter tool projecting from an end of the holder, said holder being rotatable on its pivot to two alternative positions, in one of which the tool holder is projected laterally of the bar and against said stop plate, and in the other of which the tool holder is telescoped between the slot-separated portions of the bar, and a screw traversing the slot, said screw having a conical portion adapted to engage an angularly disposed surface of the tool holder and lock the tool holder in its first said position.

5. In a boring bar having a longitudinal slot extending therethrough, a tool holder pivoted to the slot-separated portions of the bar, a cutter tool projecting from an end of the holder, said holder being rotatable on its pivot to two alternative positions, in one of which the tool holder is projected laterally of the bar, and in the other of which the tool holder is telescoped between the slot-separated portions of the bar, stop means at one end of the slot in said bar, and means for clamping said holder against said stop means in its projected position.

6. In a boring bar having a longitudinal slot extending therethrough, a tool holder pivoted to the slot-separated portions of the bar, a cutter tool projecting from an end of the holder, said holder being rotatable on its pivot to two alternative positions, in one of which the tool holder is projected laterally of the bar, and in the other of which the tool holder is telescoped between the slot-separated portions of the bar, stop means at one end of the slot in said bar, and a screw traversing the slot in said bar and having a conical portion adapted to engage an angularly disposed surface of the tool holder to clamp it in said first position against said stop means.

In testimony whereof I hereunto affix my signature this 21st day of October, 1926.

FRANK L. SNYDER.